(12) United States Patent
Torii

(10) Patent No.: US 9,753,681 B2
(45) Date of Patent: Sep. 5, 2017

(54) INFORMATION PROCESSING APPARATUS TRANSMITTING A STORAGE DESTINATION OF DATA IN AN EXTERNAL INFORMATION PROCESSING APPARATUS TO AN IMAGE FORMING DEVICE FOR ACQUIRING THE DATA

(71) Applicant: CANON KABUSHIKI KAISHA, Tokyo (JP)

(72) Inventor: Minoru Torii, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 14/605,250

(22) Filed: Jan. 26, 2015

(65) Prior Publication Data

US 2015/0227329 A1    Aug. 13, 2015

(30) Foreign Application Priority Data

Feb. 10, 2014  (JP) ................................ 2014-023223

(51) Int. Cl.
*G06F 3/12*    (2006.01)

(52) U.S. Cl.
CPC ............ *G06F 3/1236* (2013.01); *G06F 3/126* (2013.01); *G06F 3/1206* (2013.01); *G06F 3/1226* (2013.01); *G06F 3/1292* (2013.01); *G06F 3/129* (2013.01); *H04N 2201/0094* (2013.01)

(58) Field of Classification Search
CPC combination set(s) only.
See application file for complete search history.

(56) References Cited

U.S. PATENT DOCUMENTS

| 8,189,225 | B1 * | 5/2012 | Lo ........................... | G06F 3/122 |
| | | | | 358/1.15 |
| 2006/0227363 | A1 * | 10/2006 | Ogura ..................... | G06F 3/1261 |
| | | | | 358/1.15 |
| 2009/0164999 | A1 * | 6/2009 | Tsuboi ................ | H04N 1/00307 |
| | | | | 718/101 |
| 2010/0321718 | A1 * | 12/2010 | Mihira ................ | H04N 1/00212 |
| | | | | 358/1.14 |
| 2011/0194140 | A1 * | 8/2011 | Sweet ..................... | G06F 3/1204 |
| | | | | 358/1.15 |
| 2012/0038948 | A1 * | 2/2012 | Park ........................ | G06F 3/1204 |
| | | | | 358/1.15 |

(Continued)

FOREIGN PATENT DOCUMENTS

JP          10-275063          10/1998

*Primary Examiner* — Henok A Shiferaw
(74) *Attorney, Agent, or Firm* — Fitzpatrick, Cella, Harper & Scinto

(57) ABSTRACT

An information processing apparatus displays data that is saved by an external information processing apparatus, identifies an image forming device by short-range wireless communication, and acquires compatibility information indicating whether or not the image forming device is compatible with a print method for acquiring the data from the external information processing apparatus and printing based on the data. An information processing apparatus transmits instructional information for acquiring the data designated by a user from the external information processing apparatus and printing based on the data to the image forming device, if the compatibility information indicates that the image forming device is compatible with the print method.

15 Claims, 15 Drawing Sheets

(56) References Cited

U.S. PATENT DOCUMENTS

| | | | |
|---|---|---|---|
| 2013/0321861 A1* | 12/2013 | Ishihara | G06F 3/1224 358/1.15 |
| 2014/0368865 A1* | 12/2014 | Gutnik | G06F 3/1222 358/1.15 |
| 2015/0070725 A1* | 3/2015 | Monden | G06F 3/1232 358/1.15 |

* cited by examiner

INFORMATION PROCESSING APPARATUS TRANSMITTING A STORAGE DESTINATION OF DATA IN AN EXTERNAL INFORMATION PROCESSING APPARATUS TO AN IMAGE FORMING DEVICE FOR ACQUIRING THE DATA

BACKGROUND OF THE INVENTION

Field of the Invention

The present invention relates to an information processing apparatus, a control method, and a storage medium.

Description of the Related Art

In recent years, it has become possible to conduct communication with devices using short-range wireless communication such as near field communication (NFC). NFC is an international standard for conducting short-range communication by the proximate disposition of devices.

Apart from the technology for the aforementioned short-range wireless communication, there is also technology for conducting printing via servers. Japanese Patent Laid-Open No. 10-275063 discloses a technology whereby print data is transmitted to a print server from a client, and the print server transmits the print data to a printer if the printer is in a printable condition.

For example, if the data to be printed is already stored in an external information processing apparatus such as a server, one may primarily conceive of the following three problems with respect to printing of the stored data. The first problem is how to select the image forming device. The second problem is that one does not know whether the selected image forming device is compatible with a print method for acquiring the data from the external information processing apparatus and printing based on the data. The final problem relates to printing instructions if there is compatibility with the aforementioned print method.

In this regard, with respect to the aforementioned Japanese Patent Laid-Open No. 10-275063, there is no disclosure of technology for selecting a printer, or technology for ascertaining which print methods the printer is compatible with. Moreover, with the technology disclosed in Japanese Patent Laid-Open No. 10-275063, print data is transmitted to a print server from a client, and the print data is transmitted to a printer from the print server if the printer is in a printable condition. Consequently, it has not been possible to conduct printing of print data already stored on the print server in conjunction with identification of a printer.

SUMMARY OF THE INVENTION

The present invention achieves highly convenient printing by identifying an image forming device by short-range wireless communication, and by transmitting instructional information for acquiring data from an external information processing apparatus and printing based on the data if the image forming device is compatible with the aforementioned print method.

The information processing apparatus of one embodiment of the present invention includes: a display unit configured to display data that is saved by an external information processing apparatus; an identification unit configured to identify an image forming device by short-range wireless communication; an acquisition unit configured to acquire, from the image forming device, compatibility information indicating whether or not the image forming device is compatible with a print method for acquiring the data from the external information processing apparatus and printing based on the data; and a transmission unit configured to transmit, to the image forming device, instructional information for acquiring the data designated by a user from the external information processing apparatus and printing based on the data, if the compatibility information indicates that the image forming device is compatible with the print method.

Further features of the present invention will become apparent from the following description of exemplary embodiments with reference to the attached drawings.

DESCRIPTION OF THE EMBODIMENTS

Figure 1:
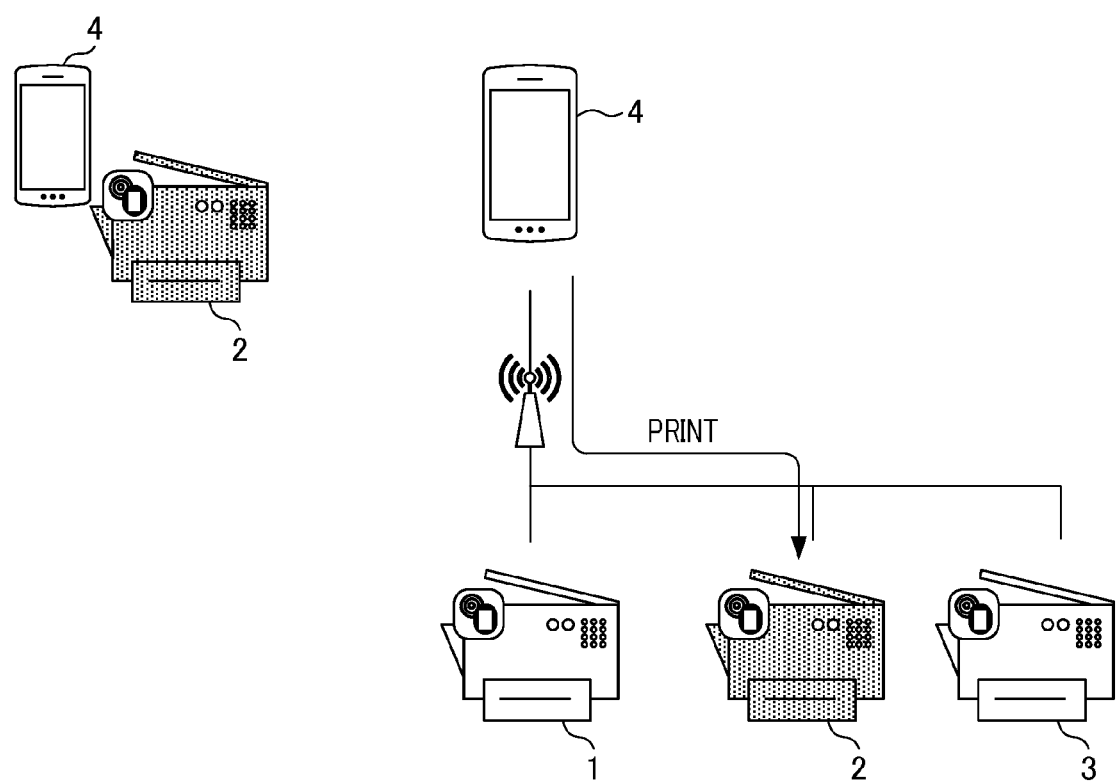
FIG. 1 is a drawing which shows an overview of a print system that uses short-range wireless communication.

First, a description is given of the print methods that are treated in this Specification. FIG. 1 shows an example where a portable terminal 4 provided with NFC is brought into proximity with a device 2, and recognizes it, after which the recognized device 2 conducts printing. Devices 1 to 3 are devices that are connected to a network. There is a method which conducts transmission of a document stored inside the portable terminal, or a PDL into which the document is converted using a rendering function inside the portable terminal, if printing is carried out from a portable terminal by recognizing a device with use of NFC (first print method). PDL is an abbreviation for "printer description language."

Figure 2:
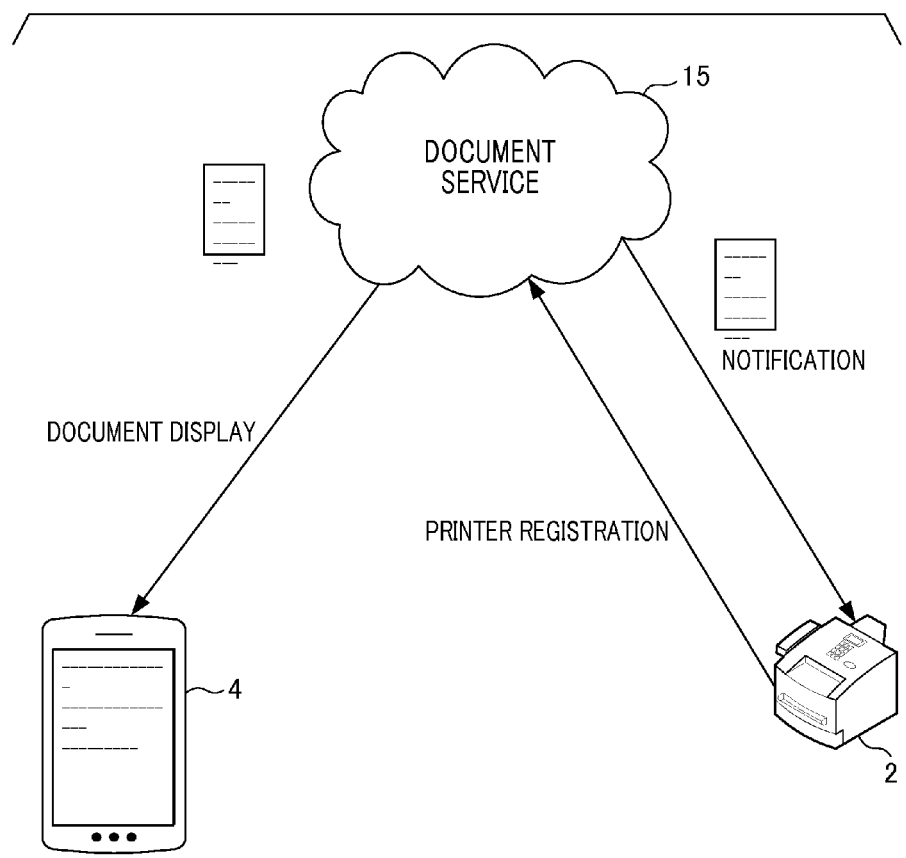
FIG. 2 is a drawing which shows an overview of a print system that uses a cloud-based print service.

On the other hand, as shown in FIG. 2, a method is available which performs printing by using a server or a document service on a network. If a document or image to be printed does not exist inside the portable terminal, but exists in an on-premise server or a cloud-based service, the portable terminal issues a print request to the on-premise server or the cloud-based service. There is then a method whereby the device receives a print request notice from the on-premise server or the cloud-based service, and the device acquires the document, or a PDL obtained by converting the document using a rendering function inside the server or service (second print method).

First Embodiment

Figure 3:
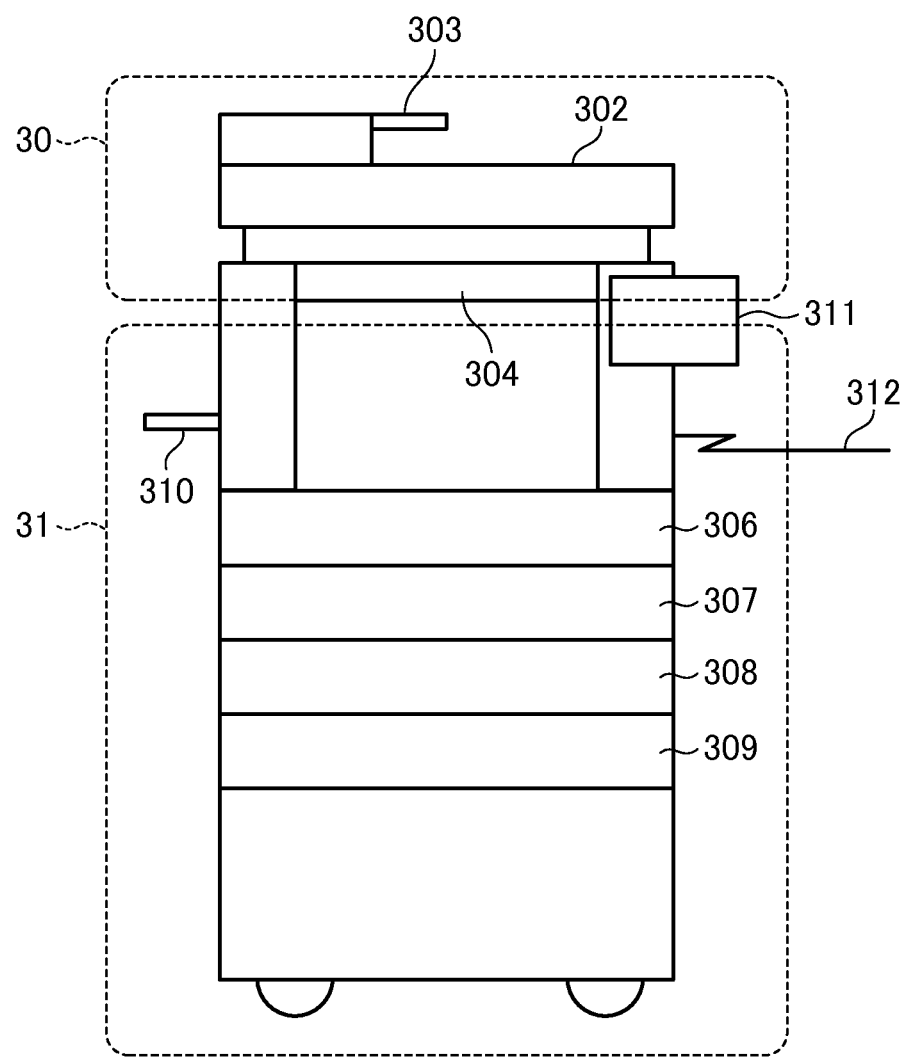
FIG. 3 is a drawing which shows an example of a device configuration.

A detailed description is given below of an embodiment of the present invention with reference to drawings. The embodiment of the present invention assumes an environment that mixes the system configurations shown in FIG. 1 and FIG. 2. FIG. 3 is an external view of the device 2, which is an image forming device. The device 2 is provided with a scanner unit 30, and a printer unit 31. The scanner unit 30 which is an image input device illuminates an image depicted on an original, reads the image by scanning CCD line sensors (not illustrated in the drawings), and converts it to electrical signals as raster image data. A user sets original paper in a tray 303 of an original feeder 302, and issues an instruction for reading of the original paper from an operating panel 304. Upon receiving the instruction from a controller CPU, the scanner unit 30 is activated, and conducts reading operation with respect to the original image. The original paper is fed one sheet at a time from the feeder 302.

The printer unit 31 which is an image output device converts electrical raster image data into a visible image on paper. With respect to the conversion method, there is the electrophotographic method that uses a photosensitive drum or a photosensitive belt, the inkjet method that discharges ink from a micronozzle array, and that directly prints images onto paper, and so on, but any method may be used. The printer unit 31 is activated upon receiving an instruction from the controller CPU.

The printer unit 31 is provided with multiple paper supply levels allowing selection of different paper sizes or different paper orientations. Paper cassettes 306, 307, 308, and 309 show examples of paper supply levels. A paper discharge tray 310 receives paper for which printing is completed. A short-range search unit 311 initiates communication with the device 2 as a result of a user holding out a portable terminal toward the short-range search unit. In the present embodiment, NFC is assumed as the short-range search unit, but one is not limited thereto. For example, one may use FeliCa (registered trademark), MIFARE (registered trademark), RFID (radio frequency identification), Trancefer Jet, and so on. A communication unit 312 conducts network communications such as WiFi, Ethernet (registered trademark) and the like.

Figure 4:
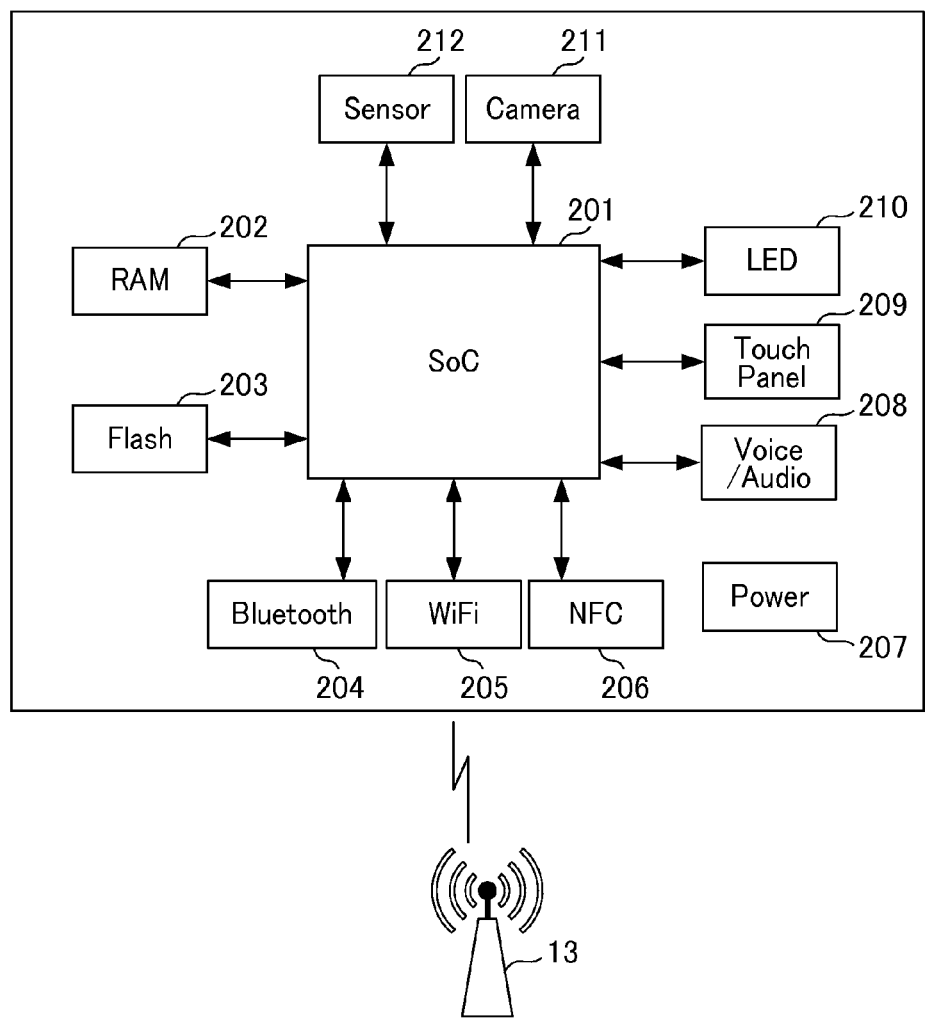
FIG. 4 is a drawing which shows an example of hardware configuration of an information processing apparatus.

FIG. 4 is a drawing which shows a configuration of a portable terminal 4 that functions as an information processing apparatus. A program of the portable terminal 4 is stored in a flash memory ("flash") 203. The hardware control entity is an SoC (system on a chip) 201, and the software control entity is a print system 100 stored in the flash memory ("flash") 203.

Bluetooth (registered trademark) 204 and NFC 206 are capable of conducting near field communication with the device 2. If the NFC 206 is used, the NFC conducts near field communication with the NFC with which the device 2 is provided. A WiFi 205 conducts wireless communication with the device 2 by wireless communication, and a RAM (random access memory) functions as a temporary work memory of the SoC 201.

Power 207 is a power source of the portable terminal 4. Voice/Audio 208 is an input/output unit for microphones, speakers, and the like. Touch panel 209 is a touch panel where the user conducts manipulations by finger. LED (light emitting diode) 210 conducts display using LED. Camera 211 conducts photography, videography, and the like. WiFi access point 13 is a WiFi access point. In this embodiment, the OS is, for example, assumed to be Android (registered trademark) of Google (registered trademark), but one is not limited thereto.

Figure 5:
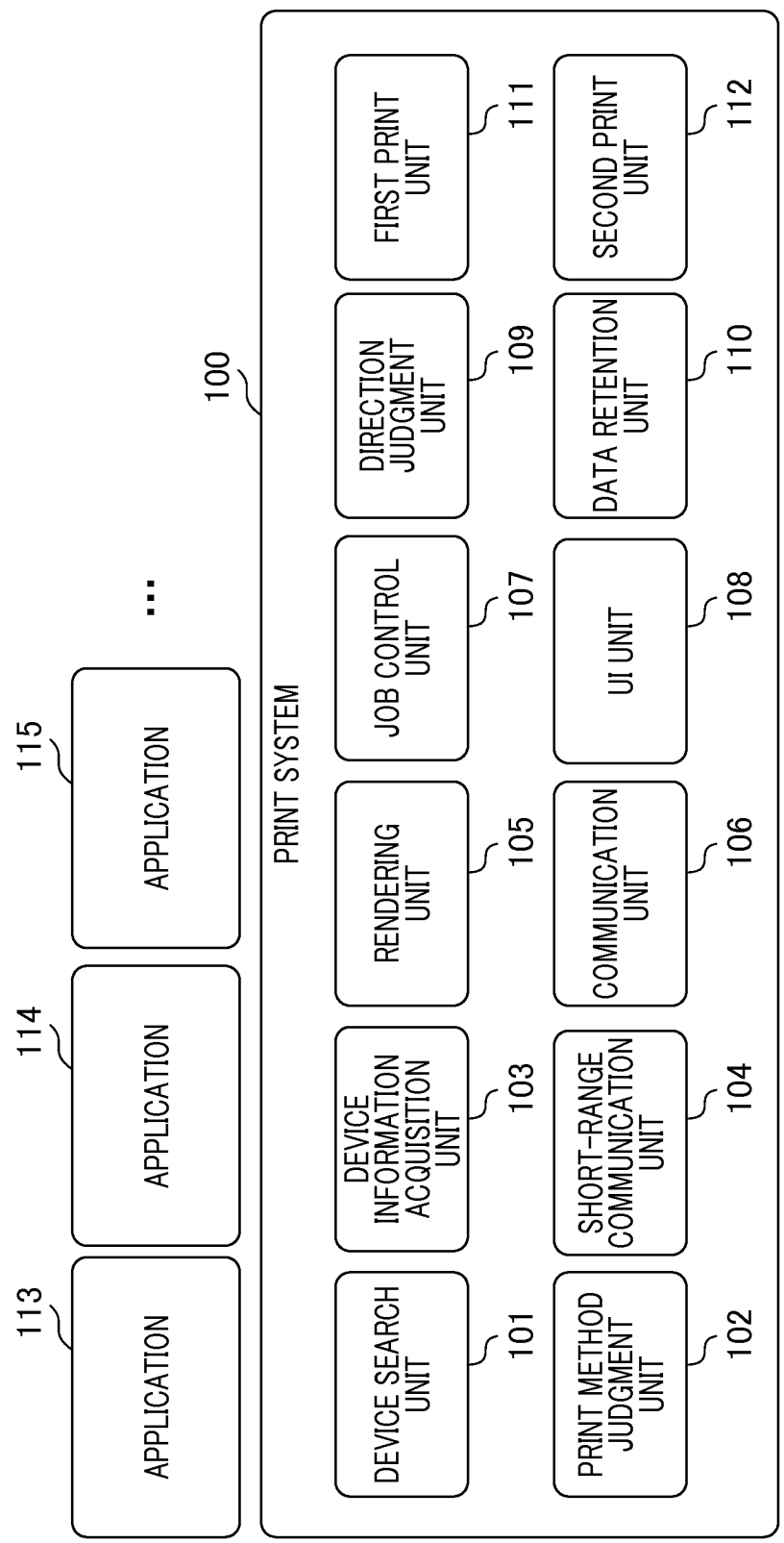
FIG. 5 is a drawing which shows an example of software configuration of an information processing apparatus.

FIG. 5 is a block diagram which shows a software configuration example of the portable terminal 4. A print system 100 of the portable terminal 4 is provided with a device search unit 101, a print method judgment unit 102, a device information acquisition unit 103, a short-range communication unit 104, a rendering unit 105, a communication unit 106, a job control unit 107, and a UI (user interface) 108. The portable terminal 4 is provided with a direction judgment unit 109, a data retention unit 110, a first print unit 111, and a second print unit 112. Applications 113 through 115 are applications that use the portable terminal 4.

The device search unit 101 searches for a device using multicast. With respect to the protocol, SLP or Multicast-DNS is used, but one is not limited thereto. There are also cases where broadcast may be used instead of multicast. The print method judgment unit 102 judges whether the first print method is to be used wherein data is transmitted directly from the portable terminal 4 to the device 2, or whether the second print method is to be used wherein data is transmitted via a print service or a server. As a result of judgment, the print method judgment unit 102 determines whether the first print unit 111 or the second print unit 112 is to be used.

The device information acquisition unit 103 acquires device information such as the current position of the device 2, and the model name from the device 2. The short-range communication unit 104 recognizes the device using short-range communication (e.g., NFC). In the embodiment, NFC is assumed as the short-range search unit, but one is not limited thereto. The rendering unit 105 renders a document that is generated or displayed in applications 113 to 115 into PDL (Page Description Language) or an image that can be printed by the device 2.

The communication unit 106 uses WiFi to conduct network communication with the device 2, and with a server or service 15 in which documents are stored. The job control unit 107 conducts job control such as queuing of print jobs. The UI unit 108 is the user interface. The direction judgment unit 109 is a sensor such as a gyroscope or a magnetic sensor that serves to judge an orientation of the portable terminal 4. The data retention unit 110 accesses storage or an SD card inside the portable terminal 4, and retains files such as documents and images.

The first print unit 111 transmits a document or PDL to the device 2 using the rendering unit 105 and the communication unit 106. The second print unit 112 uses the communication unit 106 to issue a request to the device 2 so that a document or PDL from the server or service 15 is acquired by the device 2.

Figure 6:
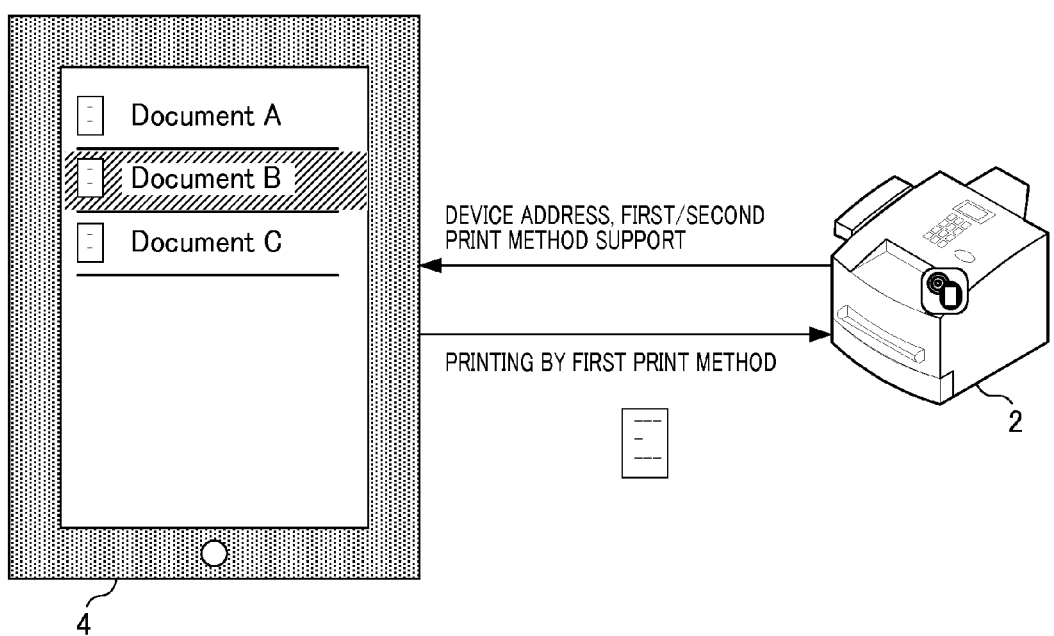
FIG. 6 is a drawing which shows an outline of a first print method.

Next, a description is given of the first print method and the second print method of the present embodiment using FIG. 6 to FIG. 10. FIG. 6 is a drawing which shows the first print method of the present embodiment. The portable terminal 4 uses short-range wireless communication to acquire information from the device 2 indicating the address of the device, and whether the first print method and the second print method are supported. With respect to the device address, the URL of the device is assumed, but one is not limited to the URL of the device, and any address allowing network communication between the device 2 and the portable terminal 4 is acceptable such as an IP address or FQDN.

Existence or non-existence of support for the first print method and the second print method is what indicates device capability in terms of whether the device 2 is able to conduct printing using the first print method or the second print method. It is either a case where—due to the device model, and the installation status of print applications—only the first print method is supported, or a case where both the first print method and the second print method are supported. For example, a device 2 in which cloud printing is disabled in the panel of the device 2 only supports the first print method. In the case of compatibility with cloud printing, it is shown that the second print method is supported-details are described below using FIG. 9.

Figure 7:
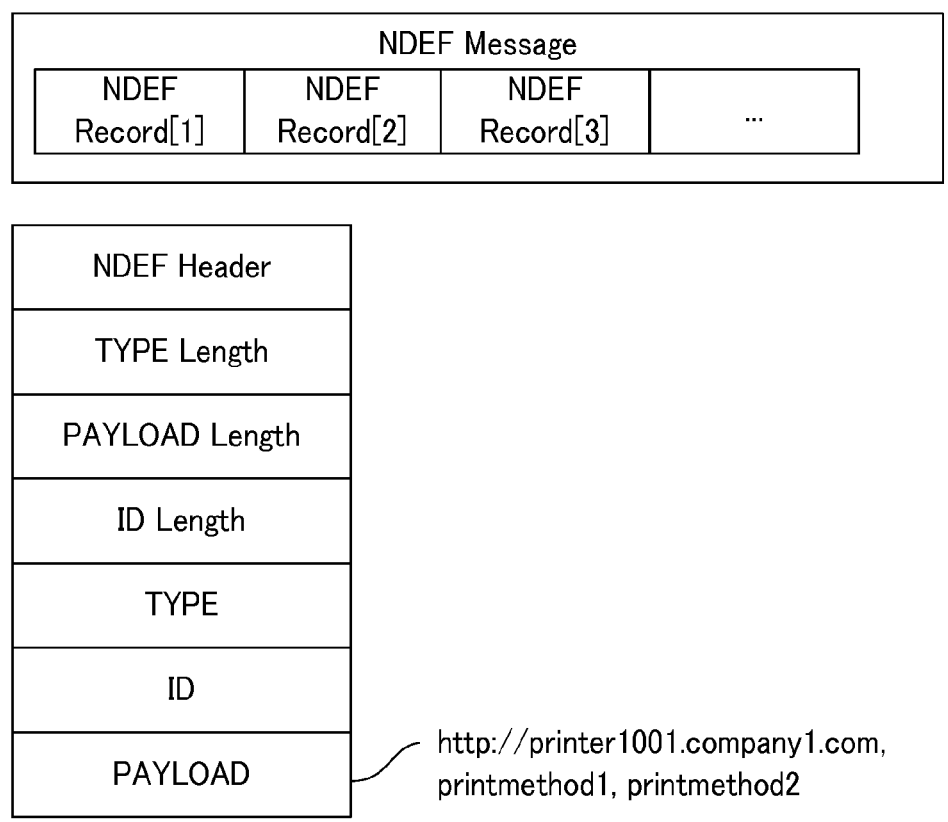
FIG. 7 shows an example of an NFC data exchange format.

FIG. 7 is a drawing which shows an NDEF (NFC data exchange format) acquired using short-range wireless communication. In this example, http://printer1001.company1.com, printmethod1, printmethod2 is described as PAYLOAD. The URL of the device is indicated by http://printer1001.company1.com, and support of the first print method and the second print method is shown by printmethod1, printmethod2. After acquiring the address of the device 2, the portable terminal 4 transmits document data, PDL, or instructional information in order to acquire data from the service 15 and print based on the data to the device 2. The device 2 conducts printing using the received data, or the data acquired from the service 15.

Figure 8:
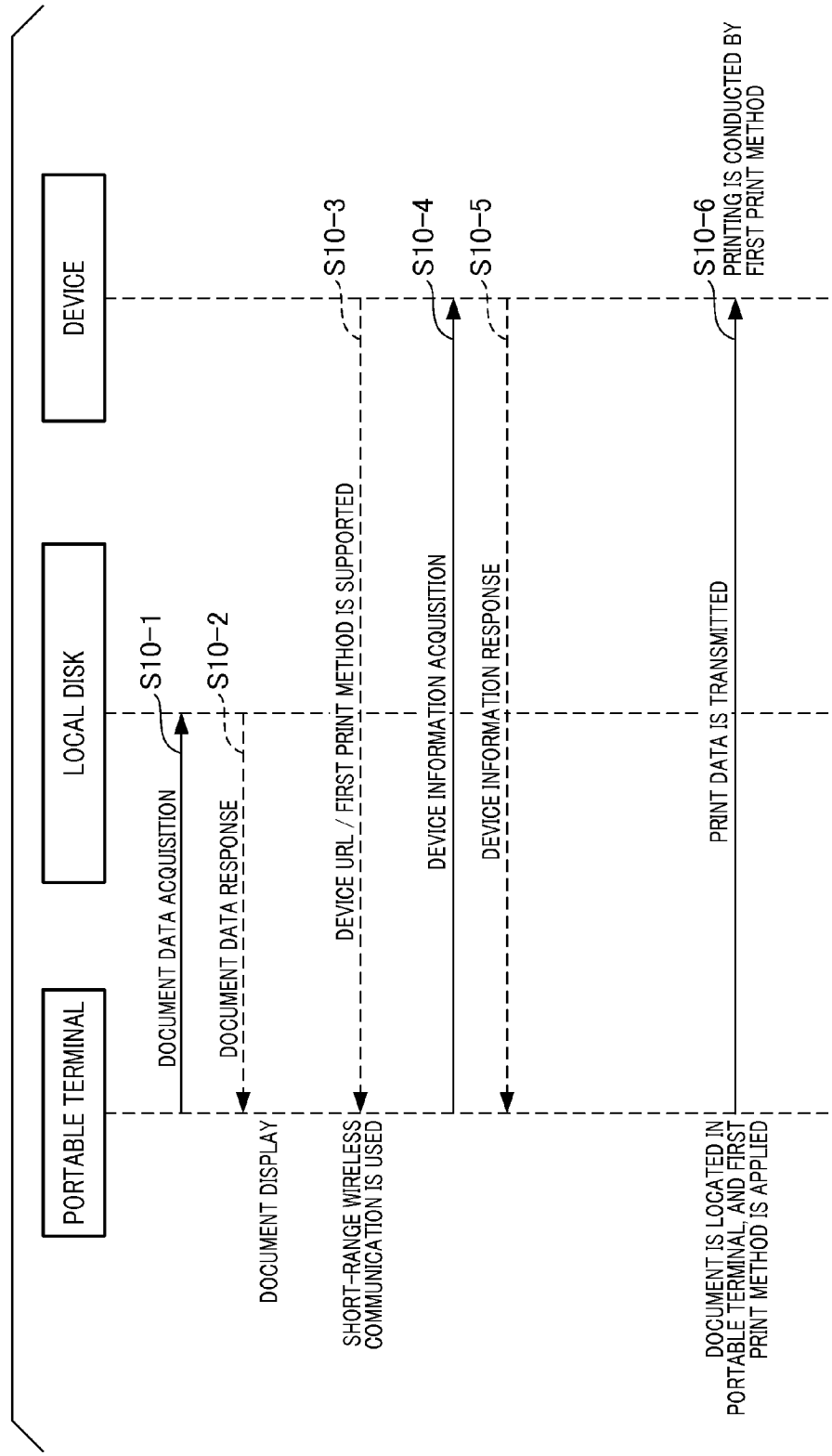
FIG. 8 is sequence diagram for execution of the first print method.

FIG. 8 is a sequence drawing which shows operations of the first print method. In S10-1, the UI unit 108 of the portable terminal 4 acquires document data from the data retention unit 110 which is the storage inside the portable terminal 4. In S10-2, the UI unit 108 conducts display upon acquisition of the document data. In S10-3, the short-range communication unit 104 uses short-range wireless communication to acquire information from the device 2 indicating the address of the device 2, and whether or not there is support for the first print method and the second print method. In this sequence example, information is acquired which shows the URL of the device, and support for only the first print method.

Next, in S10-4, the device information acquisition unit 103 uses the acquired device address to issue a request to the device 2 for acquisition of device information. With respect to communication between the device 2 and the portable terminal 4 from S10-4 onward, network communication is used. In S10-5, the device 2 responds to the portable terminal 4 with device information such as model name and device ID. The print method judgment unit 102 of the portable terminal 4 judges that the first print method is to be applied, because the storage site of the document is the portable terminal itself. With the first print method, print data is transmitted directly from the portable terminal 4 to the device, and printing is conducted. In S10-6, the first print unit 111 of the portable terminal 4 transmits print data, and a print ticket that records print settings to the device 2. The device 2 then conducts printing.

Figure 9:
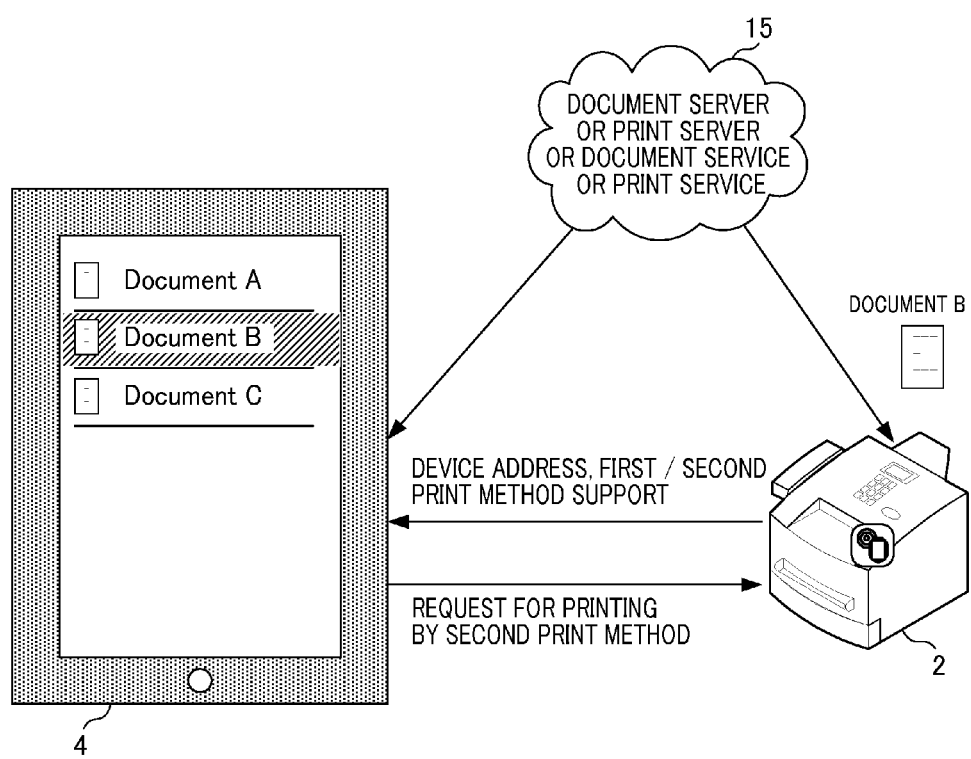
FIG. 9 is a drawing which shows an outline of a second print method.

FIG. 9 is a drawing which shows the second print method of the present embodiment. The portable terminal 4 uses short-range wireless communication to acquire information indicating a device address, and whether or not there is support for the first print method and the second print method. After acquiring the address of the device, the portable terminal 4 transmits a print request to the device 2 along with the URL of the server/service, the URL of the document, and a token that enables access to the server/service. In this specification, server and service are distinguished in the following manner. That is, a server is an external information processing apparatus which is a document server or a print server that operates in an on-premise environment. A service is an external information processing apparatus which operates in a cloud environment. For purposes of simplicity, the service 15 is described below. In the present embodiment, the server or the service functions as the external information processing apparatus that is the acquisition source whereby the device 2 acquires the data to be printed using the second print method. The device 2 acquires the data—a document or PDL—from the server or service 15, and conducts printing.

Figure 10:
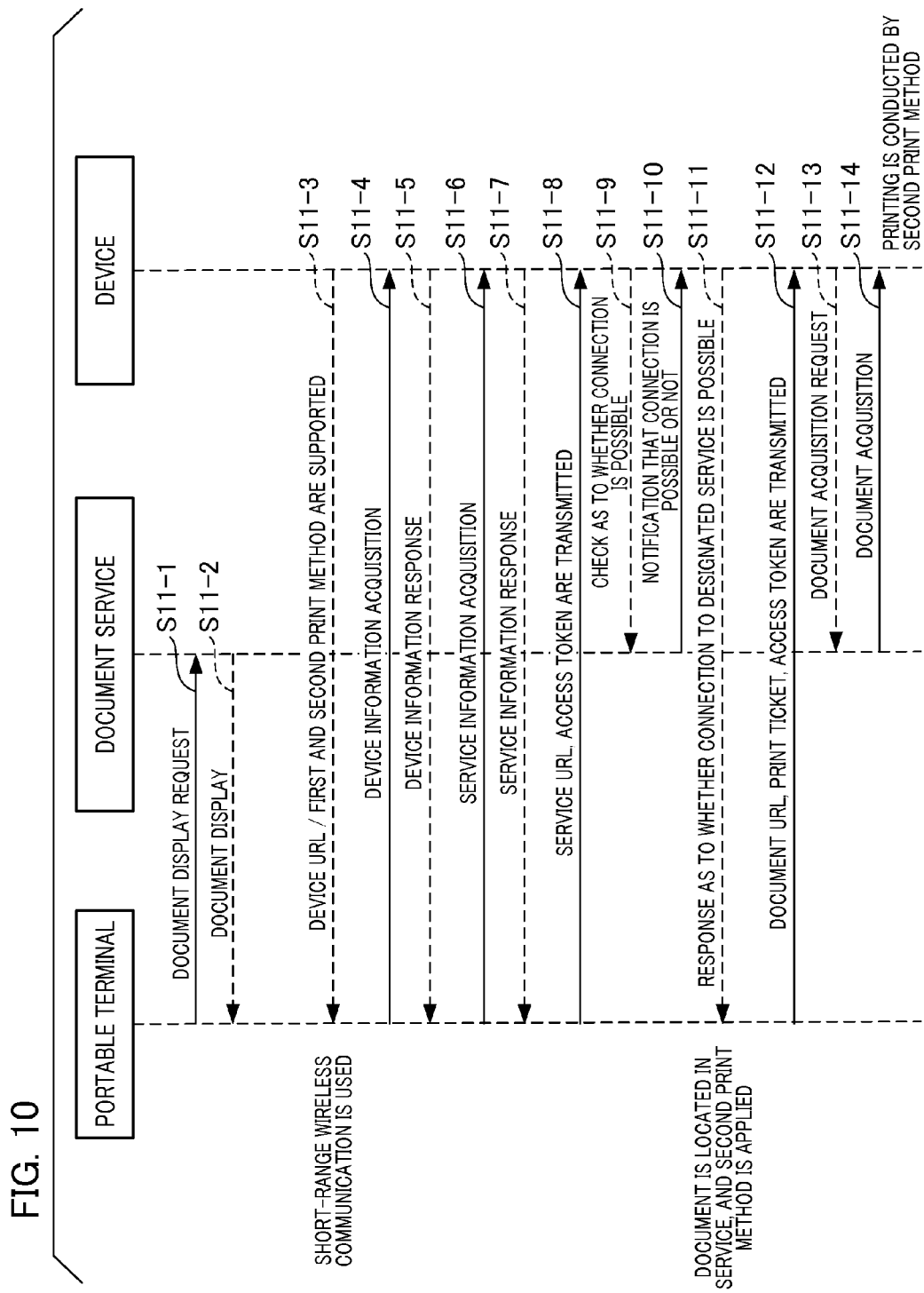
FIG. 10 is a sequence diagram for execution of the second print method.

FIG. 10 is a sequence drawing which shows operations of the second print method. In S11-1, the communication unit 106 of the portable terminal 4 issues a request to the service 15 for acquisition of document data. In S11-2, the UI unit 108 acquires document data from the service 15, and displays it. In S11-3, the near-range communication unit 104 uses short-range wireless communication to acquire the address of the device 2, and compatibility information indicating whether or not the device 2 is compatible with the first print method and the second print method from the device 2. In this sequence example, the device URL, and compatibility information indicating that both the first print method and the second print method are supported are acquired.

Next, in S11-4, the device information acquisition unit 103 uses the acquired device address to issue a request to the device 2 for acquisition of device information used for network communication. With respect to communication between the device 2 and the portable terminal 4 from S11-4 onward, network communication is used. In S11-5, the device 2 responds to the portable terminal 4 with device information such as model name and device ID. In S11-6, the device information acquisition unit 103 issues a request for acquisition of service information by the device 2. In S11-7, the device 2 responds to the portable terminal 4 that it is acquiring the document from the service 15, and that printing is possible.

In S11-8, the communication unit 106 of the portable terminal 4 transmits the URL of the service 15 and the token for access to the service 15 to the device 2. In S11-9, the device 2 checks whether it is possible to connect to the service 15. In S11-10, the service 15 responds to the device 2 as to whether or not connection is acceptable. In S11-11, the device 2 responds to the portable terminal 4 as to whether connection to the service 15 is possible. In this example, the device 2 is able to connect to the service 15.

The print method judgment unit 102 of the portable terminal 4 then judges that the second print method is to be applied, because the storage site of the document is a service. With the second print method, a request is transmitted to the device 2 to acquire a document or print data from the service 15, and the device 2 acquires the document or print data from the service 15, and conducts printing based on the document or the data. In S11-12, the portable terminal 4 transmits the instructional information for acquiring the data designated by the user from the service 15 and printing based on the data to the device 2. Specifically, the second print unit 112 transmits the document URL, the print ticket that records the print settings, and the access token for access to the service 15 to the device 2. In S11-13, the device 2 issues a document acquisition request to the service 15. In S11-14, the device 2 acquires the document from the service 15. The device 2 then conducts printing.

In the sequence diagrams shown in FIG. 8 and FIG. 10, the configuration is such that the processing after device information acquisition processing is conducted by network communication, but one is not limited thereto, and it may also be conducted by short-range wireless communication.

Figure 11:
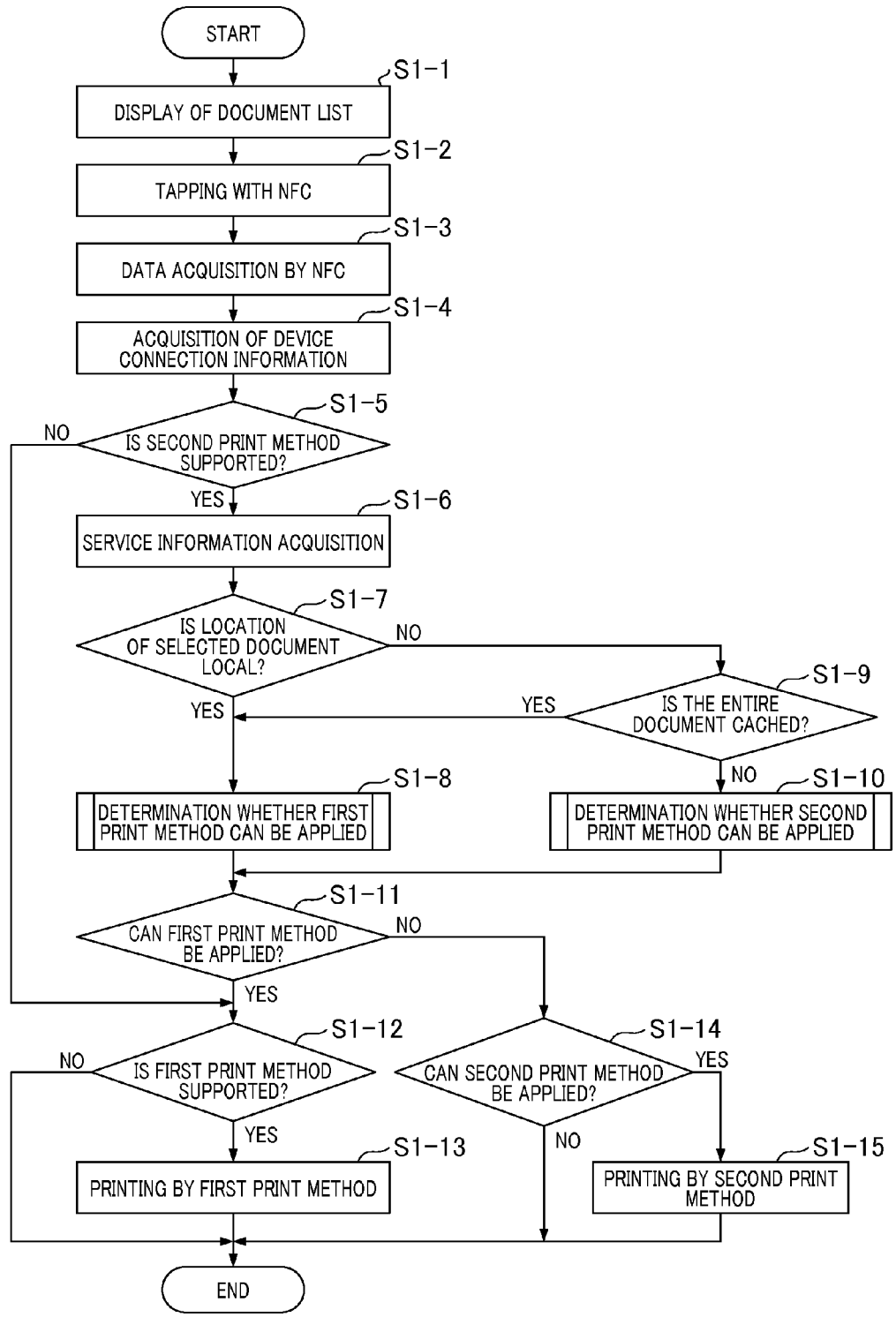
FIG. 11 is a flowchart which shows determination of the first print method and the second print method.

FIG. 11 is a flowchart which shows a method for judging whether to use the first print method or the second print method. In S1-1, the portable terminal 4 displays on a screen a list of the documents or images retained by itself or by the service 15. In S1-2, when the user brings the portable terminal 4 into proximity with the device 2, the portable terminal 4 identifies the device 2 using short-range wireless communication (e.g., NFC), and acquires the NFC tag information (S1-3). The NFC tag stores the address (e.g., the URL of the device) enabling communication with the device, and compatibility information indicating whether the first print method and the second print method are supported.

In S1-4, the portable terminal 4 communicates with the device 2, and acquires the device information of the device 2. The device information that is acquired is information necessary for identifying the device or driver such as model name and device ID. In S1-5, the portable terminal 4 judges whether the device 2 supports the second print method. Specifically, it is judged whether the compatibility information acquired in S1-3 indicates that the second print method is supported. If the second print method is not supported, the processing advances to S1-12 and S1-13, and printing is conducted by the first print method. If the second print method is supported, the processing advances to S1-6. In S1-6, the portable terminal 4 acquires the information of the server or service to which the device 2 is able to connect. The information that is acquired here is the URL or the like of the server or service 15.

In S1-7, the portable terminal 4 judges whether the storage site of the document selected in S1-1 is the portable terminal. If the portable terminal 4 retains the document in its own memory, storage, or SD card, it is determined that the storage site is the portable terminal. If the document storage site is the portable terminal, the processing advances to S1-8, where it is determined whether the first print method can be applied. The method for determining whether the first print method can be applied is described using the flowchart of FIG. 12. If the storage site of the document is not the portable terminal—i.e., if it exists on a server or service—the processing advances to S1-9, where the portable terminal 4 judges whether the document is cached in the memory of the portable terminal. If it is cached, the processing advances to S1-8, where it is determined whether the first print method can be applied. If it is not cached, the processing advances to S1-10, where the portable terminal 4 determines whether the second print method can be applied. The method for determining whether the second print method can be applied is described using the flowchart of FIG. 13. In S1-8 or S1-10, the portable terminal 4 decides whether the first print method or the second print method is to be used.

In S1-11, the portable terminal 4 judges whether the first print method is to be applied. If the first print method is to be applied, the processing advances to S1-12, where it is judged whether the device 2 supports the first print method. If the device 2 supports the first print method, the portable terminal 4 conducts printing by the first print method in S1-13. If the device 2 does not support the first print method, the portable terminal 4 terminates processing. If the first print method is not to be applied, the processing advances to S1-14, where the portable terminal 4 judges whether the second print method can be applied. If the second print method can be applied, the processing advances to S1-15, where the portable terminal 4 conducts printing by the second print method. If the second print method cannot be applied, the portable terminal 4 terminates processing.

In the above-described flowcharts, compatibility information indicating whether or not there is support for the first print method and the second print method is acquired in S1-3, but it is sufficient if compatibility information is acquired indicating whether or not there is support for either the first print method or the second print method. Or it is sufficient to acquire only compatibility information indicating whether or not the second print method is supported, without acquiring compatibility information indicating whether or not the first print method is supported. Moreover, in the processing of S1-5, the processing from S1-6 onward is performed if the device is compatible with the second print method. However, it is also acceptable to adopt a configuration wherein the second print method is applied if it is determined that there is compatibility with the second print method, without performing the processing from S1-6 onward.

In the processing of S1-9, the portable terminal 4 determines whether or not the document is cached in the memory of the portable terminal 4, and the processing advances to S1-8 if it is so cached. At this time, the portable terminal 4 may also judge the size of the data that is cached. In short, the portable terminal 4 may judge that the first print method cannot be applied if the cached data exceeds a threshold value, whereby processing would advance to S1-14. By this means, the load imposed on the portable terminal 4 can be reduced.

Figure 12:
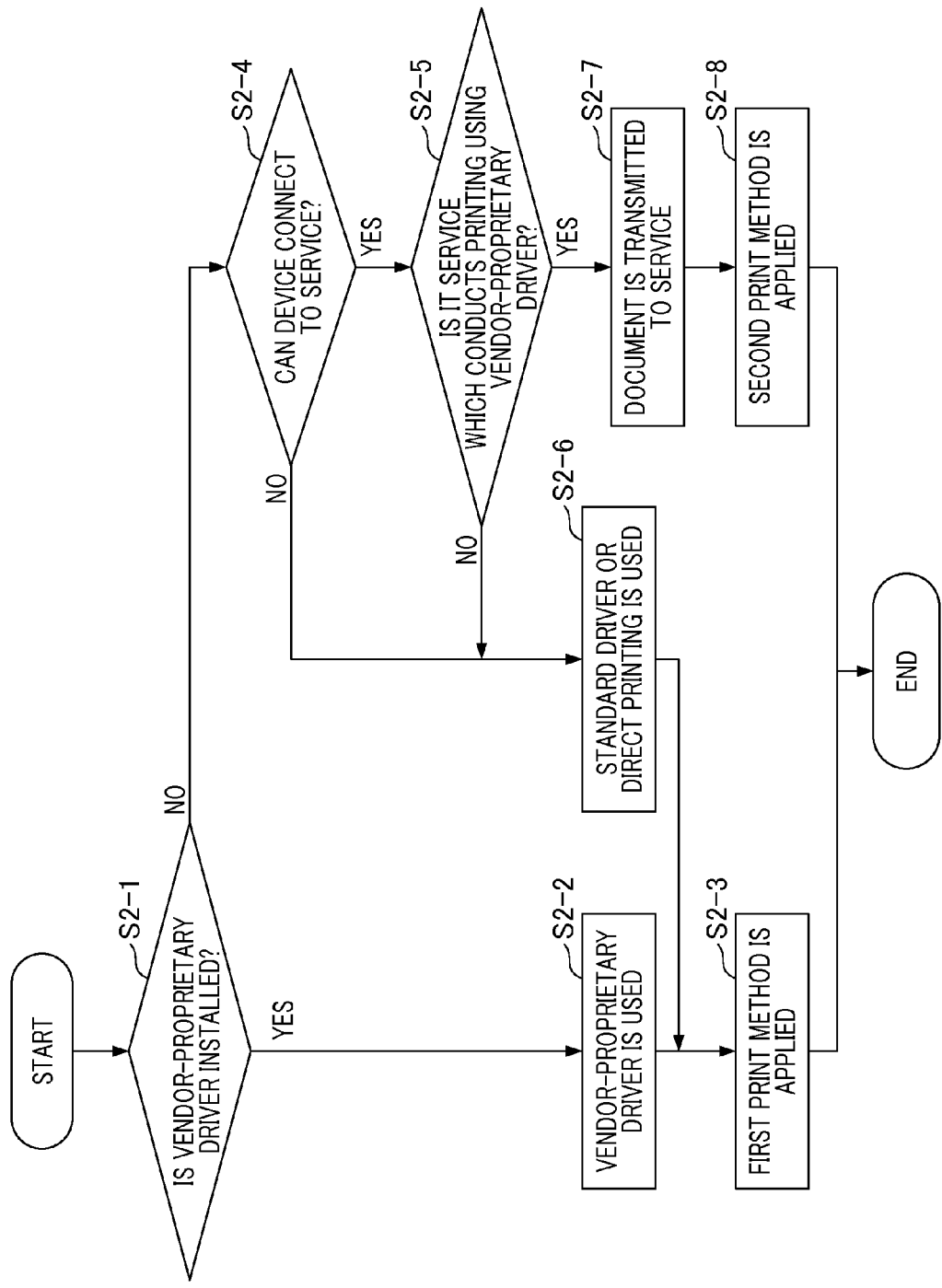
FIG. 12 is a flowchart which determines whether the first print method can be applied.

FIG. 12 is a flowchart for determination processing that is conducted when determining whether the first print method can be applied. In S2-1, the portable terminal 4 judges whether a vendor-proprietary driver is installed. If a vendor-proprietary driver is installed, the processing advances to S2-2, and the proprietary driver are used. In S2-3, the portable terminal 4 applies the first print method using the vendor-proprietary driver. If a vendor-proprietary driver is not installed in S2-1, the processing advances to S2-4. In S2-4, the portable terminal 4 judges whether the device 2 is able to connect to the service 15. If it is not able to connect, the processing advances to S2-6. In S2-6, the portable terminal 4 either decides to transmit converted data to the device 2 using the driver that is typically loaded in the OS, or to use direct printing in which the document is transmitted as is to the device 2. Processing then advances to S2-3, where the portable terminal 4 determines that the first print method is to be applied using a standard driver or using direct printing.

If the device 2 is able to connect to the service 15 in S2-4, the processing advances to S2-5. In S2-5, the portable terminal 4 judges whether the service 15 to be connected to is a service that is capable of data conversion using a vendor-proprietary driver. If it is a service capable of data conversion using a vendor-proprietary driver, the processing advances to S2-7. If the first print method is to be used, the data storage site is the portable terminal, and all of the document data is cached. The portable terminal 4 therefore transmits the document to the service 15. In S2-8, the portable terminal 4 determines that the second print method is to be applied. If it is not a service or sever which is capable of data conversion using a vendor-proprietary driver, the processing advances to S2-6 and S2-3, and the portable terminal 4 determines that the first print method is to be applied using a standard driver or using direct printing.

Figure 13:
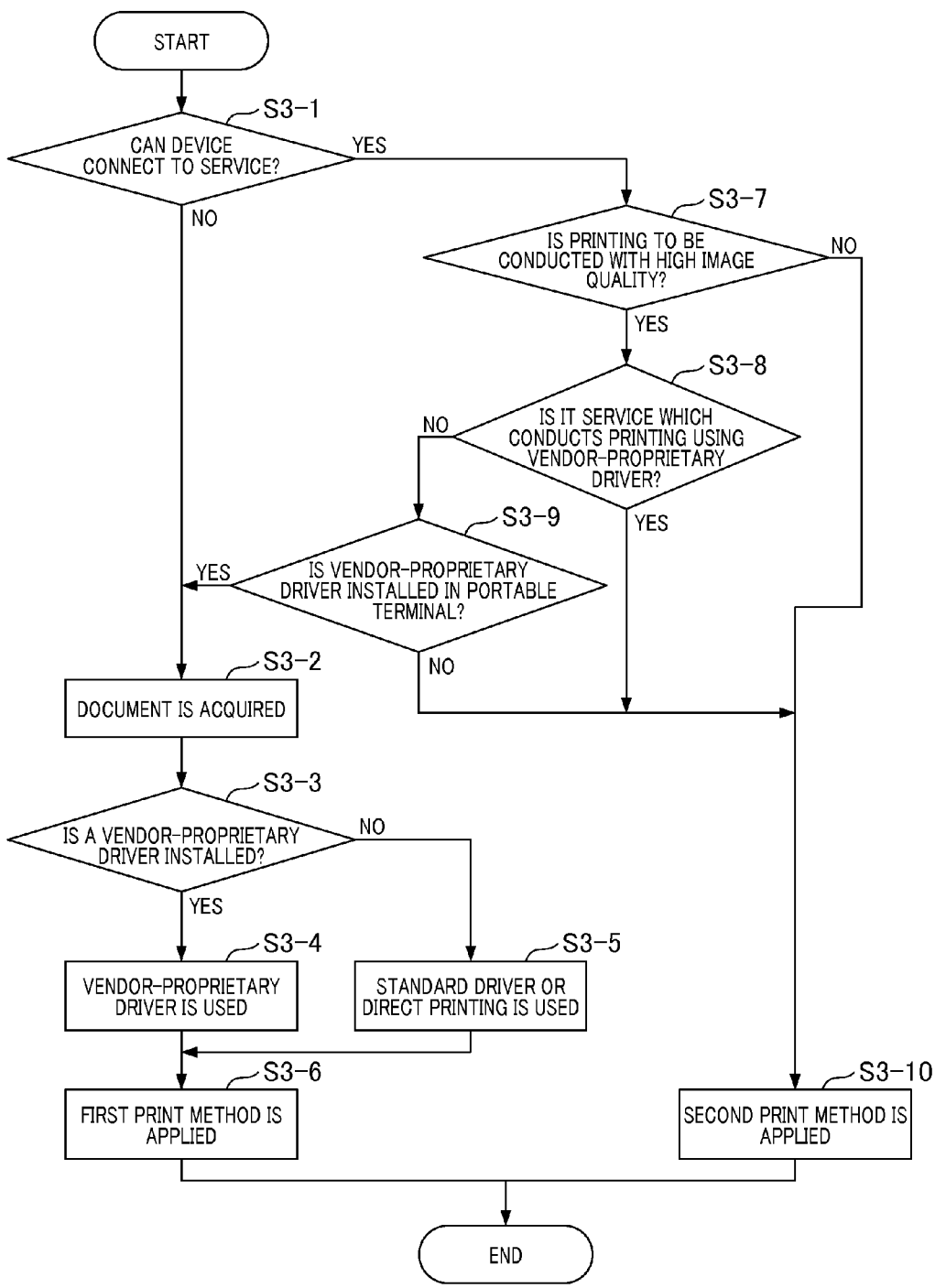
FIG. 13 is a flowchart which determines whether the second print method can be applied.

FIG. 13 is a flowchart for determination processing that is conducted when determining whether the second print method can be applied. In S3-1, the portable terminal 4 judges whether or not the device 2 is able to connect to the service 15. If the device 2 is not able to connect to the service 15, the portable terminal 4 acquires the document from the service 15 in S3-2. In S3-3, the portable terminal 4 checks whether a vendor-proprietary driver is installed. If a vendor-proprietary driver is installed, the processing advances to S3-4, and the vendor-proprietary driver is used. If a vendor-proprietary driver is not installed, the processing advances to S3-5, and a standard driver or direct printing is used. Subsequently, the processing advances to S3-6, and the portable terminal 4 determines that the first print method is to be applied.

If the device 2 is able to connect to the service 15 in S3-1, the portable terminal 4 determines in S3-7 whether the user has selected that printing be conducted with a high image quality. If the user has not selected high image quality printing, the processing advances to S3-10, where the portable terminal 4 determines that the second print method is to be applied. If the user has selected high image quality printing in S3-7, the portable terminal 4 judges whether the service 15 is a service capable of data conversion using a vendor-proprietary driver. If the service 15 is a service capable of data conversion using a vendor-proprietary driver, the processing advances to S3-10, where the portable terminal 4 determines that the second print method is to be applied.

If the service 15 is not a service capable of data conversion using a vendor-proprietary driver, the processing advances to S3-9, where it is checked whether a vendor-proprietary driver is installed in the portable terminal 4. If a vendor-proprietary driver is not installed, the processing advances to S3-10, where the portable terminal 4 determines that the second print method is to be applied. If a vendor proprietary driver is installed in the portable terminal 4, the processing advances to S3-2, where the document is acquired from the server or the service 15. Subsequently the processing advances to the above-described S3-3, S3-4 or S3-5, S3-6, where the portable terminal 4 determines that the first print method is to be applied. According to the present invention, when print instructions are issued using short-range wireless communication as described above, it is possible to provide a mechanism whereby a device conducts acquiring data from a portable terminal or an external information processing apparatus and printing based on the data, without designation of a print method by a user.

Figure 14:
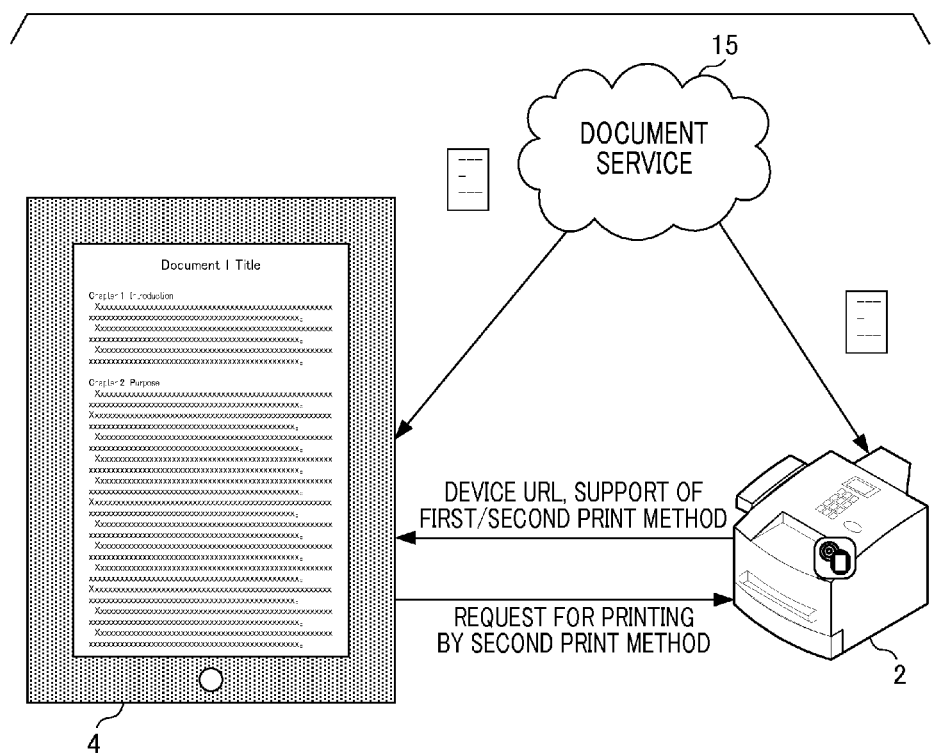
FIG. 14 is a drawing which shows an example of operations during document display.

FIG. 14 is an operational example when the device 2 is tapped while the portable terminal 4 is displaying a document. S1-1 of FIG. 11 shows an example where a document list is displayed, but S1-1 of FIG. 14 is in a condition where the document to be printed is displayed. The processing of S1-2 to S1-15 is identical to the operations described above.

Figure 15:
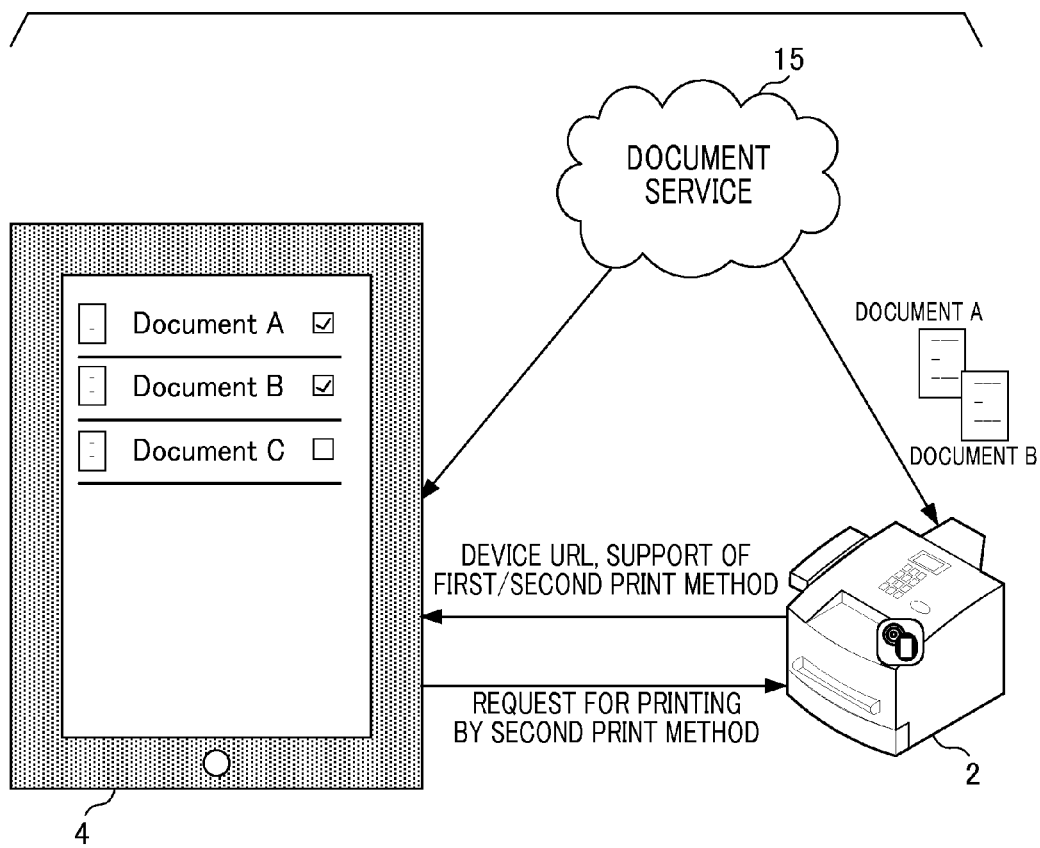
FIG. 15 is a drawing which shows a summary of operations when multiple documents are selected.

FIG. 15 is an operational example when the device 2 is tapped when the portable terminal 4 has selected a plurality of documents. If multiple documents are selected, the portable terminal 4 repeats the processing of S1-7 to S1-15 of FIG. 11 for each selected document. If it is determined that the first print method is to be applied to the first document, and that the second print method is to be applied to the second document, the portable terminal 4 transmits the first document, and the information for acquiring the second document from the service 15 to the device 2. According to this configuration, print methods can be provided that combine the first print method and the second print method, enhancing operability for the user.

Other Embodiments

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023223, filed Feb. 10, 2014, which is hereby incorporated by reference herein in its entirety.

What is claimed is:

1. An information processing apparatus, comprising a memory and a processor in communication with the memory configured to control:

a display unit configured to display data that is saved by an external information processing apparatus;

an identification unit configured to identify an image forming device by short-range wireless communication;

an acquisition unit configured to acquire, from the image forming device, compatibility information indicating whether or not the image forming device is compatible with a first print method for acquiring the data from the external information processing apparatus, and printing based on the data; and a transmission unit configured to transmit, to the image forming device, a storage destination of the data in the external information processing apparatus so that the image forming device acquires the data and prints based on the acquired data, if the compatibility information indicates that the image forming device is compatible with the first print method, and to generate print data and transmit the generated print data to the image forming device, if the image forming device is not compatible with the first print method but is compatible with a second print method for receiving print data from the information processing apparatus and printing based on the received print data.

2. The information processing apparatus according to claim 1, wherein the transmission unit transmits the storage destination to the image forming device if the data is not stored in the information processing apparatus itself and if the image forming device is compatible with the first print method.

3. The information processing apparatus according to claim 1, wherein the identification unit identifies the image forming device without receiving a selection of the image forming device if the data displayed by the display unit is designated by the user.

4. The information processing apparatus according to claim 1, wherein the compatibility information includes whether communication of the image forming device with the external information processing apparatus is possible or not.

5. The information processing apparatus according to claim 1, wherein, in a case that the data is stored in the information processing apparatus itself, and the image forming device is compatible with the first print method, the transmission unit transmits the storage destination to the image forming device if a size of the data exceeds a threshold value.

6. The information processing apparatus according to claim 1, wherein, in a case that the data is stored in the information processing apparatus itself and a proprietary driver is required to print the data, and the image forming device is compatible with the first print method, the transmission unit transmits the storage destination to the image forming device if the proprietary driver is not installed in the information processing apparatus.

7. The information processing apparatus according to claim 1,
wherein the acquisition unit acquires the compatibility information from the image forming device for each document if data pertaining to multiple documents is designated, and
wherein the transmission unit transmits the storage destination or the print data to the image forming device for each document according to whether or not the compatibility information indicates that the image forming device is compatible with the first print method.

8. A control method for controlling an information processing apparatus, the method comprising:
displaying data that is saved by an external information processing apparatus;
identifying an image forming device by short-range wireless communication;
acquiring, from the image forming device, compatibility information indicating whether or not the image forming device is compatible with a first print method for acquiring the data from the external information processing apparatus and printing based on the data; and
transmitting, to the image forming device, a storage destination of the data in the external information processing apparatus so that the image forming device acquires the data and prints based on the acquired data, if the compatibility information indicates that the image forming device is compatible with the first print method, and generating print data and transmitting the generated print data to the image forming device, if the image forming device is not compatible with the first print method but is compatible with a second print method for receiving print data from the information processing apparatus and printing based on the received print data.

9. The control method according to claim 8, wherein the transmitting transmits the storage destination to the image forming device if the data is not stored in the information processing apparatus itself and the image forming device is compatible with the first print method.

10. The control method according to claim 8, wherein the identifying identifies the image forming device without receiving a selection of the image forming device if the data displayed in the displaying is designated by the user.

11. The control method according to claim 8, wherein the compatibility information includes whether communication of the image forming device with the external information processing apparatus is possible or not.

12. The control method according to claim 8, wherein, in a case that the data is stored in the information processing apparatus itself, and the image forming device is compatible with the first print method, the transmitting transmits the storage destination to the image forming device if a size of the data exceeds a threshold value.

13. The control method according to claim 8, wherein, in a case that the data is stored in the information processing apparatus itself and a proprietary driver is required to print the data, and the image forming device is compatible with the first print method, the transmitting transmits the storage destination to the image forming device if the proprietary driver is not installed in the information processing apparatus itself.

14. The control method according to claim 8,
wherein the acquiring acquires the compatibility information from the image forming device for each document if data pertaining to multiple documents is designated, and
wherein the transmitting transmits the storage destination or the print data to the image forming device for each document according to whether or not the compatibility information indicates that the image forming device is compatible with the first print method.

15. A non-transitory storage medium on which is stored a computer program for making a computer execute a control method for controlling an information processing apparatus, the program comprising:
code for displaying data that is saved by an external information processing apparatus;
code for identifying an image forming device by short-range wireless communication;
code for acquiring, from the image forming device, compatibility information indicating whether or not the image forming device is compatible with a first print method for acquiring data from the external information processing apparatus, and printing based on the data; and
code for transmitting, to the image forming device, a storage destination of the data in the external information processing apparatus so that the image forming device acquires the data and prints based on the acquired data, if the compatibility information indicates that the image forming device is compatible with the first print method, and for generating print data and transmitting the generated print data to the image forming device, if the image forming device is not compatible with the first print method but is compatible with a second print method for receiving print data from the information processing apparatus and printing based on the received print data.

* * * * *